3,732,087
TETRASILICIC MICA GLASS-CERAMIC METHOD
David G. Grossman, Painted Post, N.Y., assignor to
Corning Glass Works, Corning, N.Y.
Filed Feb. 24, 1971, Ser. No. 117,933
Int. Cl. C03b *29/00;* C03c *3/22*
U.S. Cl. 65—33                                 3 Claims

ABSTRACT OF THE DISCLOSURE

This invention relates to the production of tetrasilicic fluorine mica glass-ceramic articles from the controlled heat treatment of crystallizable glasses containing, in weight percent on the oxide basis, 45–70% $SiO_2$, 8–20% MgO, 8–15% $MgF_2$, a total of 5–35% [$R_2O+RO$], wherein $R_2O$ ranges from about 5–25% and consists of one or more oxides selected in the indicated proportions from the group consisting of 0–20% $K_2O$, 0–23% $Rb_2O$ and 0–25% $Cs_2O$, and wherein RO ranges from 0–20% and consists of one or more oxides selected from the group consisting of SrO, BaO and CdO, a total of 0–10% of oxides selected from the group consisting of $As_2O_5$ and $Sb_2O_5$, and up to about 5% of glass colorants. These tetrasilicic mica products exhibit good machinability with steel tools, good mechanical strength, moderate thermal expansion and good chemical durability. The use of the optional constituents $As_2O_5$, $Sb_2O_5$ and the glass colorants permits the production of translucent glass-ceramics and glass-ceramics having the appearance of marble.

BACKGROUND OF THE INVENTION

Figure 1:
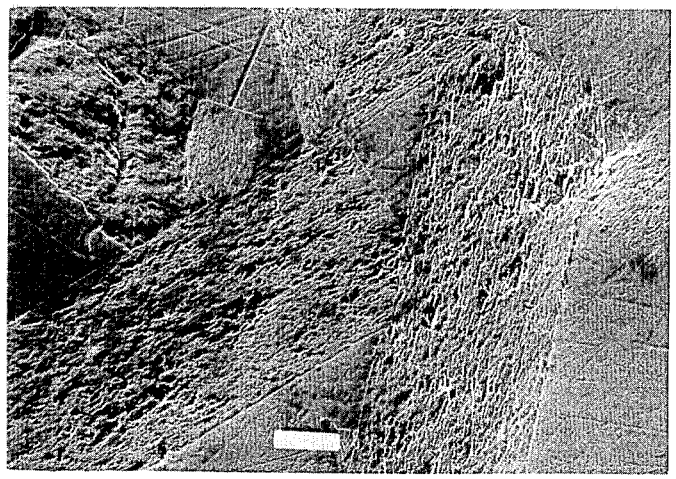

A glass-ceramic article results from the controlled crystallization in situ of a glass article. Hence, the manufacture of glass-ceramics normally involves three general steps: first, the compounding of a glass-forming batch containing a nucleating or crystallization-promoting agent; second, the melting of the batch to form a homogeneous liquid and the simultaneous cooling and shaping of the melt to form a glass article of the desired dimensions and configuration; and, finally, the heat treatment of the glass article so produced in accordance with a specifically defined time-temperature schedule to develop nuclei in the glass which act as sites for the growth of crystals as the heat treatment proceeds.

Since the crystallization in situ is brought about through an essentially simultaneous crystal growth on countless nuclei, the structure of a glass-ceramic article comprises relatively uniformly-sized crystals homogeneously dispersed in a residual glassy matrix, these crystals constituting the predominant proportion of the article. Thus, glass-ceramic articles are frequently described as being at least 50% crystalline and, in numerous instances, are actually over 75% crystalline. In view of this very high crystallinity, the chemical and physical properties of glass-ceramic articles are normally materially different from those of the original glass and are more closely related to those demonstrated by the crystal phase. Also, the residual glass matrix will have a far different composition from that of the parent glass since the components making up the crystal phase will have been precipitated therefrom.

Because a glass-ceramic article is the result of the crystallization in situ of a glass article, conventional glass forming methods such as blowing, casting, drawing, pressing, rolling, spinning, etc. can usually be employed in securing the desired configuration to an article. Also, like glass, a glass-ceramic article is non-porous and free of voids.

U.S. Pat. No. 2,920,971, the basic patent in the field of glass-ceramics, provides an extensive study of the practical aspects and theoretical considerations that must be understood in the manufacture of such articles, as well as a discussion of the crystallization mechanism. Reference is made thereto for further explanation of these matters.

The micas comprise a family of silica minerals that have a unique two-dimensional layered or sheet structure. Naturally occurring mica consisting of large, book-like crystals can readily be split into thicknesses of 0.001" or less. The property of flexibility, coupled with high dielectric strength, has made sheet mica a very important electrical insulating material.

Most naturally-occurring micas are hydroxyl silicates whereas many synthetic micas have been produced by replacing the hydroxyl groups within the mica structure with fluorine. Much research has been undertaken in the field of synthetic mica, and this work can be categorized into five general areas: efforts to produce single crystals of fluorine mica, hot-pressed fluormica ceramics, glass-bonded fluormica ceramics, fusion cast mica materials, and, recently, fluormica glass-ceramics.

The crystalline structure of fluormica has been studied extensively, with the generalized structural formula being written as $X_{0.5-1}Y_{2-3}Z_4O_{10}F_2$, where X represents cations which are relatively large in size, i.e., 1.0–1.6 A. radius, Y represents somewhat smaller cations, i.e., 0.6–0.9 A. radius, and Z represents small cations, 0.3–0.5 A. radius, which coordinate to four oxygens. The X cations are in dodecahedral coordination and the Y cations in octahedral coordination. The basic unit of the mica structure is the $Z_2O_5$ hexagonal sheet, formed because each $ZO_4$ tetrahedron shares three of its corners with three other such tetrahedrons in a plane. In the fluormicas, as for all micas, two $Z_2O_5$ sheets, each with their apical oxygens and associated interstitial fluoride ions directed toward each other, are bonded together by the Y cations. These cations coordinate octahedrally with two apical oxygens and one fluoride ion from each $Z_2O_5$ sheet. The resultant mica layer has been called a 2 to 1 layer because it consists of one octahedral sheet sandwiched between two tetrahedral sheets. The fluoride ions and apical oxygens of the tetrahedral sheets offset the cations of the octahedral sheet. The mica layers themselves are bonded to each other by the relatively large X cations in the so-called interlayer sites. These X cations are normally potassium but are sometimes other large alkali metal and alkaline earth metal cations such as $Na^+$, $Rb^+$, $Cs^+$, $Ca^{+2}$, $Sr^{+2}$, $Cd^{+2}$, and $Ba^{+2}$.

SUMMARY OF THE INVENTION

I have now discovered that glass-ceramic articles consisting essentially of tetrasilicic fluormica crystals dispersed in a minor glassy phase can be produced from relatively stable clear to opal glasses over a particularly defined composition area. These glasses consist essentially, in weight percent on the oxide basis as calculated from the batch, of 45–70% $SiO_2$, 8–20% MgO, 8–15% $MgF_2$ and a total of 5–35% [$R_2O+RO$], wherein $R_2O$ ranges from about 5–25% and consists of one or more oxides selected in the indicated proportions from the group consisting of 0–20% $K_2O$, 0–23% $Rb_2O$, and 0–25% $Cs_2O$, and wherein RO ranges from 0–20% and consists of one or more oxides selected from the group consisting of SrO, BaO, and CdO. Optional constituents which may be added to alter the properties of the glass-ceramic products include a total of 0–10% of oxides selected from the group consisting of $As_2O_5$, and $Sb_2O_5$, and a total of 0–5% of glass colorant.

In the fluorine micas which crystallize from the glasses of this invention, the X, Y and Z positions are believed to be filled in the following manner: X position—K, Rb, Cs, Sr, Ba or Cd as available; Y position—Mg only; and Z position—Si only. These micas, which normally have the postulated formula $KMg_{2.5}Si_4O_{10}F_2$, are described as tetrasilicic because they do not display Al- or B-for-Si substitutions in the $Z_2O_5$ hexagonal sheets of the mica layer as do the fluorophlogopites ($KMg_3AlSi_3O_{10}F_2$) and boron fluorophlogopites ($KMg_3BSi_3O_{10}F_2$). Thus, although the basic mica structure of the glass-ceramics of the invention, as identified by X-ray diffraction, is of the phlogopite type, having a diffraction pattern closely matching that of boron fluorophlogopite, the tetrahedral sheets are made up exclusively of $SiO_4$ tetrahedra, there normally being no other cations present in the glass composition small enough to take up the four-coordinated Z positions. From a study of the X-ray diffraction data it appears that tetrasilicic fluormica is the primary crystalline species present in the finished glass-ceramics, the usual variations being in which of the $K^+$, $Rb^+$, $Cs^+$, $Sr^{+2}$, $Ba^{+2}$, or $Cd^{+2}$ ions (or combinations thereof) occupies the X or interlayer positions. The Y positions are believed almost exclusively occupied by $Mg^{+2}$ ions, and very few deficiencies in either the X or Y positions are expected. Thus, the glass-ceramics of the present invention are related to prior art mica glass-ceramics in that they contain synthetic mica crystals, but they are distinguishable on the basis that they do not contain trivalent cations such as $Al^{+3}$ and $B^{+3}$ as essential crystal constituents.

Minor additions of other oxides to the base glass composition, such as $P_2O_5$, $TiO_2$, $ZrO_2$, FeO, ZnO, $GeO_2$, MnO, $La_2O_3$, and $SnO_2$ can be tolerated to a total of about 10% by weight and may be useful, for example, in controlling the properties of the parent glass and the residual glassy phase.

In general terms, then, my invention comprises melting a batch for a glass consisting essentially, in weight percent on the oxide basis as calculated from the batch, of about 45–70% $SiO_2$, 8–20% MgO, 8–15% $MgF_2$, a total of 5–35% [$R_2O$+RO] wherein $R_2O$ ranges from about 5–25% and consists of one or more oxides selected in the indicated proportions from the group consisting of 0–20% $K_2O$, 0–23% $Rb_2O$ and 0–25% $Cs_2O$, and wherein RO ranges from 0–20% and consists of one or more oxides selected from the group consisting of SrO, BaO and CdO, a total of 0–10% of oxides selected from the group consisting of $As_2O_5$ and $Sb_2O_5$, and up to about 5% of glass colorants, simultaneously cooling the melt at least below the transformation range thereof and shaping a glass article therefrom, and thereafter heat treating this glass article at temperatures between about 650°–1200° C. for a sufficient length of time to obtain the desired crystallization in situ. The transformation range has been defined as that range of temperatures over which a liquid melt is deemed to have been transformed into a amorphous solid, commonly being considered as being between the strain point and the annealing point of the glass.

Heat treatments which are suitable for transforming the glasses of the invention into predominantly crystalline mica glass-ceramics generally comprise the initial step of heating the glass article to a temperature within the nucleating range of about 650°–850° C. and maintaining it in that range for a time sufficient to form numerous crystal nuclei throughout the glass. This usually requires between about ¼ and 10 hours. Subsequently, the article is heated to a temperature in the crystallization range of from about 800°–1200° C. and maintained in that range for a time sufficient to obtain the desired degree of crystallization, this time usually ranging from about 1 to 100 hours. Inasmuch as nucleation and crystallization in situ are processes which are both time and temperature dependent, it will readily be understood that at temperatures approaching the hotter extreme of the crystallization and nucleation ranges, brief dwell periods only will be necessitated, whereas at temperatures in the cooler extremes of these ranges, long dwell periods will be required to obtain maximum nucleation and/or crystallization.

My preferred heat treating practice comprises the steps of heating the glass article to a nucleation temperature between about 750°–850° C., maintaining it in that range for about 1–6 hours, subsequently heating it to a crystallization temperature between about 1000°–1150° C., and maintaining it in the range for about 1–8 hours.

It will be appreciated that numerous modifications in the crystallization process are possible. For example, when the original batch melt is quenched below the transformation range thereof and shaped into a glass article, this article may subsequently be cooled to room temperature to permit visual inspection of the glass prior to initiating heat treatment. It may also be annealed at temperatures between about 550°–650° C. if desired. However, where speed in production and fuel economies are sought, the batch melt can simply be cooled in a glass article at some temperature just below the transformation range and the crystallization treatment begun immediately thereafter.

Further, whereas a two-step heat treatment schedule is to be preferred, a very satisfactory crystallized body can be achieved when the original glass article is merely heated from some temperature below the transformation range to temperatures within the range from about 750°–1150° C. and maintained within that range for a sufficient length of time to induce the desired crystallization. Also, it is apparent that no single hold temperature within any of the cited ranges is absolutely required to secure satisfactory crystallization. Rather, the temperatures may vary at will within the designated ranges. Thus, if the rate of heating the glass body above the transformation range is relatively low and the final crystallization temperature employed is relatively high, no hold period at any one temperature will be required. In cases where it is desirable to minimize deformation, I prefer to employ heating rates of about 3°–5° C./minute. These heating rates have produced little, if any, deformation throughout the composition field operable in this invention.

Figure 2:
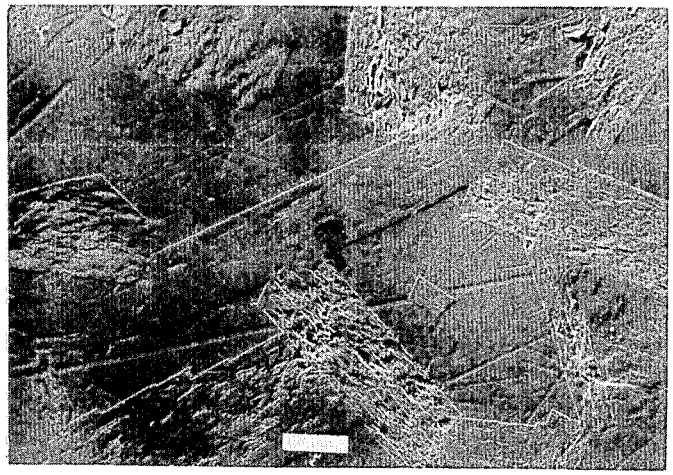

The invention may be further understood by reference to the following detailed description thereof and to the appended electron micrographs, FIG. 1 and FIG. 2 which show the crystalline microstructure of two different glass-ceramics of the invention.

DESCRIPTION OF THE PREFERRED EMBODIMENTS

As previously disclosed, all of the micas of the invention may be classified generally as tetrasilicic micas. It is presently believed that magnesium fluoride (sellaite) is the first phase to crystallize from the glass upon heat treatment, and that subsequent heating to higher temperatures rapidly causes mica crystallization at sites occupied by sellaite nuclei. However, this hypothesis is difficult to confirm since no sellaite peak has been observed in the diffraction pattern of these materials after the onset of mica crystallization. It is believed that this is due to the disappearance of the sellaite phase during mica formation at high temperatures. In any event, tetrasilicic fluormica is the principal crystalline phase identified by X-ray diffraction which has been found to be present in quantity in the glass-ceramics of the invention. Other crystalline phases, such as enstatite and cristobalite, have been observed only in minor amounts, if at all.

Notwithstanding the fact that the crystal composition of the micas of the invention is relatively invariant, certain differences in properties may be attributed to variations in crystalline microstructure. Of course, glass-ceramics of lower crystallinity are expected to be more glass-like, and thus harder and less machinable, than those of comparatively high crystallinity. In addition, however, strength and machinability have been found to be dependent on the size and shape of the mica crystals produced. Generally, fine-grained glass-ceramics having numerous small crystals and/or crystals with a low aspect ratio have been found to be stronger and harder than those containing fewer large crystals of high aspect ratio, but also less machinable, whereas those containing a high percent of mica crystallinity with a large aspect ratio tend to be softer and more machinable.

Table I records compositions, expressed in weight percent on the oxide basis as calculated from the batch, of thermally crystallizable glasses which, when thermally treated according to the method of the invention, were crystallized in situ to relatively uniformly crystalline tetrasilicic mica glass-ceramics. The ingredients making up the glass batches may be any materials, whether oxides or other compounds, which, on being melted together, are converted to the desired compositions in the proper proportions. The batch ingredients were compounded, ball-milled together to aid in achieving a homogeneous melt, and thereafter melted in closed platinum crucibles for about 4 hours at temperatures ranging between about 1300°–1450° C. The melts were poured onto steel plates to produce patties about ½″ thick. The glass patties were immediately transferred to an annealer operating at 550°–650° C.

TABLE I

| | Percent | | | | | | | |
|---|---|---|---|---|---|---|---|---|
| | 1 | 2 | 3 | 4 | 5 | 6 | 7 | 8 |
| $K_2O$ | 13.8 | 15.8 | 9.0 | 11.0 | 7.5 | | | |
| $Rb_2O$ | | | | | | 13.9 | | |
| $Cs_2O$ | | | | | | | 19.5 | 20.2 |
| $BaO$ | | | 12.2 | 11.4 | 10.6 | | | |
| $SrO$ | | | | | | | | 7.4 |
| $MgF_2$ | 10.6 | 10.4 | 10.6 | 10.6 | 9.9 | 9.3 | 8.6 | 9.0 |
| $MgO$ | 13.8 | 13.5 | 16.2 | 16.4 | 12.9 | 12.0 | 11.2 | 11.6 |
| $SiO_2$ | 61.8 | 60.3 | 64.2 | 62.0 | 57.5 | 53.4 | 50.1 | 51.8 |

| | Percent | | | | |
|---|---|---|---|---|---|
| | 9 | 10 | 11 | 12 | 13 |
| $K_2O$ | 13.5 | 15.5 | 13.5 | 13.5 | 13.5 |
| $MgF_2$ | 10.4 | 10.2 | 10.4 | 10.4 | 10.3 |
| $MgO$ | 13.5 | 13.2 | 13.5 | 13.5 | 13.5 |
| $SiO_2$ | 60.6 | 59.1 | 60.6 | 60.5 | 60.2 |
| $As_2O_5$ | 2.0 | 2.0 | | 2.0 | 2.0 |
| $Sb_2O_5$ | | | 2.0 | | |
| $K_2Cr_2O_7$ | | | | 0.25 | |
| $KMnO_4$ | | | | | 0.54 |

TABLE I—Continued

| | Percent | | | |
|---|---|---|---|---|
| | 14 | 15 | 16 | 17 |
| $K_2O$ | 13.5 | 13.5 | 13.5 | 13.3 |
| $MgF_2$ | 10.4 | 10.3 | 10.4 | 10.3 |
| $MgO$ | 13.5 | 13.5 | 13.5 | 13.3 |
| $SiO_2$ | 60.5 | 60.1 | 60.5 | 59.7 |
| $As_2O_5$ | 2.0 | 2.0 | 2.0 | 1.9 |
| $NiO$ | 0.10 | 0.19 | | |
| $CuO$ | | | | 0.97 |
| $Cr_2O_3$ | | | | 0.48 |
| $Fe_2O_3$ | | 0.49 | | |
| $Au$ | | | 0.10 | |
| $Sn$ | | | 0.10 | |
| Cullet (composition No. 9) | | | | ᵃ 5.0 |

ᵃ In excess.

Following annealing, the glass patties were placed in an electrically-fired furnace and subjected to the heat treatment schedules reported in Table II. Upon completion of the heat treatment, the electric current to the furnace was cut off and the crystallized articles either removed directly from the furnace into the ambient atmosphere or simply left in the furnace and permitted to cool to room temperature at the furnace rate, this rate averaging between about 3°–5° C./minute. In each schedule, the temperature was raised at a rate of about 5° C./minute to the holding temperatures. Table II also records a visual description and qualitative measure of machinability of each crystallized article. Measurements of acid durability and coefficient of thermal expansion are reported where determined on individual products.

The determinations as to the machinability of the products shown in Table II were qualitative, being made on a comparative basis after drilling with steel drills and hacksawing with conventional blades. Translucence was determined for each material by visual examination in thin cross-section under ordinary lighting conditions, again on a comparative and qualitative basis. Thermal expansion is expressed in cm./cm. ° C. $10^{-7}$, with the value given being the average value observed over the range from 0°–300° C. The acid durability values are expressed in terms of the weight loss per unit area of a standard sample after immersion in 5% HCl at 95° C. for 24 hours, in milligrams per square centimeter.

TABLE II

| Example No. | Heat treatment | Visual description | Machinability | Thermal expansion (cm./cm./° C.×$10^{-7}$) | Acid durability (mg./cm.²) |
|---|---|---|---|---|---|
| 1 | 800° C. for 4 hours, 1,090° C. for 4 hours. | Fine grain fracture, offwhite, slightly translucent | Fair | 53.3 | 5.1 |
| 2 | 800° C. for 4 hours, 1,100° C. for 4 hours. | Fine cherty fracture, white, slightly translucent | do | | |
| 3 | do | Fine cherty fracture, white, opaque | do | 50.0 | 3.1 |
| 4 | 800° C. for 4 hours, 1,150° C. for 4 hours. | Fine grain fracture, white, opaque | do | | |
| 5 | 800° C. for 4 hours, 1,115° C. for 4 hours. | Coarse sugary fracture, white, slightly translucent | Excellent | 48.8 | 12.0 |
| 6 | 800° C. for 4 hours, 1,125° C. for 4 hours. | Medium grain sandy fracture, white opaque | Good | 49.6 | 13.0 |
| 7 | do | Medium grain cherty fracture, white, slightly translucent | Excellent | | 12.0 |
| 8 | do | Fine grain cherty fracture, grey opaque | do | 47.9 | 9.2 |
| 9 | 800° C. for 4 hours, 1,100° C. for 4 hours. | Fine grain fracture, white, good translucence | Very good | 58.3 | 5.0 |
| 10 | 800° C. for 4 hours, 1,065° C. for 4 hours. | Very fine grain fracture, white, excellent translucency | Good | 74.6 | 9.1 |
| 11 | 800° C. for 4 hours, 1,090° C. for 4 hours. | Fine grain fracture, white, good translucence | Fair | | |
| 12 | 800° C. for 4 hours, 1,100° C. for 4 hours. | Fine grain fracture, green-grey serpentine marble appearance | Very good | (¹) | (¹) |
| 13 | do | Fine grain fracture, pale purple marble appearance | do | (¹) | (¹) |
| 14 | do | Fine grain fracture, pale tan marble appearance | do | (¹) | (¹) |
| 15 | do | Fine grain fracture, tan marble with yellow streaks | do | (¹) | (¹) |
| 16 | do | Fine grain fracture, rusty red color | do | (¹) | (¹) |
| 17 | 800° C. for 4 hours, 1,090° C. for 4 hours. | Fine grain fracture, dark green marble with white streaks | do | (¹) | (¹) |

¹ Expected to have physical properties similar to composition Example No. 9.

Sample glass-ceramic materials having the compositions of Examples 9 and 10 of the tables are shown in the electron photomicrographs, designated FIGS. 1 and 2 respectively, wherein the white bars represent one micron. As with all of the glass-ceramics of the invention, they are highly crystalline. Visual inspection of such samples indicate at least about 50% volume crystallinity in all cases and usually significantly greater proportions ranging up to about 90%. The glass-ceramic of FIG. 2, which appears to contain somewhat smaller crystals than the material shown in FIG. 1, would be expected to be somewhat harder and less machinable by comparison therewith, and to exhibit a comparatively fine-grained fracture, on the basis of considerations previously described. Those expectations have been experimentally confirmed, as evidenced by the qualitative observations set forth in Table II.

I have also found that certain composition variations in the base glass can predictably alter the properties of the mica glass-ceramic products. Thus, increasing the quantities of the alkali metal oxides present in the base glass generally decreases the machinability and refractoriness of the resultant glass-ceramics, whereas increasing the presence of the alkaline earth metal oxides usually results in a more refractory product.

The most significant product variations, however, are obtained through the use of certain additions to the base glass batch or to the glass melt. Thus, translucent micas may be produced through the addition of oxides selected from the group consisting of $As_2O_5$ and $Sb_2O_5$ to the glass batch. Translucent micas are considered for use in high temperature lamps and in decorative or ornamental applications. Generally, additions totalling between about 0.5–8% by weight of the batch are preferred, and additions in excess of about 10% do not appear to have any further beneficial effect on the product. While both of these additives will increase the translucence of these mica glass-ceramics, $As_2O_5$ is preferred because it also greatly increases the machinability thereof.

Translucence can also be improved by controlling the composition of the base glass so that large amounts of alkali metal oxides and little or no alkaline earth metal oxides are present. However, when comparatively large quantities of alkali metal oxides are to be employed, I prefer to use $K_2O$ rather than $Rb_2O$ or $Cs_2O$, since these latter constituents do not provide any significant advantages over $K_2O$ and add greatly to the cost of the batch. Glass compositions consisting essentially, in weight percent on the oxide basis as calculated from the batch, of about 55–65% $SiO_2$, 12–20% MgO, 9–13% $MgF_2$, 7–18% $K_2O$, and 0.5–8% $As_2O_5$ are preferred in the manufacture of mica glass-ceramics combining good machinability with optimum translucence.

The addition of glass colorants to the translucent mica glass-ceramic compositions of the present invention has produced machinable materials capable of taking a polish and having the appearance of marble. Preferably, these colorants are added to the glass melt just prior to forming in such a way as to produce a streaking effect. Generally, any of the conventional glass colorants known to the art may be used. Thus, the transition metal compounds of V, Cr, Mn, Fe, Co, Ni and Cu, the rare earth colorant compounds such as $Nd_2O_5$, the colloidal metal colorants such as elemental Au have been found to be suitable in the production of artificial marbles. I have found that these additives may be usefully employed in amounts totalling up to about 5% by weight of the batch, but quantities in excess of about 5% can produce excessively dark coloring, and thus are not deemed particularly desirable. Normally, such colorant additions will not exceed about 2%. Glass compositions which are preferred in producing artificial marbles according to the present invention are those consisting essentially, in weight percent on the oxide basis as calculated from the batch, of about 55–65% $SiO_2$, 12–20% MgO, 9–13% $MgF_2$, 7–18% $K_2O$, 0.5–8% $As_2O_3$ and from a trace to about 2% of glass colorants selected from the group consisting of $K_2Cr_2O_7$, $KMnO_4$, NiO, CuO, $Cr_2O_3$, $Fe_2O_3$, FeO, $V_2O_5$, CoO, elemental Au and $Nd_2O_5$.

The appearance of artificial marbles produced according to the present invention may vary considerably depending upon the particular technique employed in utilizing the glass colorants. Normally, the colorants will be added to the base glass melt shortly prior to pouring or forming, either in the form of the colorant compound, a colored glass melt or colored glass cullet. Alternatively, the principal melt may be of a colored glass, and a white streaking effect obtained through the addition of a colorless glass melt or cullet. Numerous other variations in the above techniques will, of course, be apparent to those skilled in the art. Thus, artificial marbles may be produced in large sheets, or large slabs and blocks may be produced simply by stacking sheets and sagging them together to produce monolithic bodies.

These materials have good machinability and moderate thermal expansion, and their modulus of rupture ranges from about 5 to 10 times that of naturally-occurring marble. Furthermore, their acid durability is good; 24 hour weight losses in 5% HCl at 95° C. range from a high of about 12 milligrams down to about 3 milligrams or less per square centimeter of surface area. Such durability compares very favorably with that of naturally-occurring marble, which can exhibit weight losses under comparable conditions of up to about 265 milligrams per square centimeter. Such properties and characteristics make artificial marbles produced according to the present invention eminently suitable for building, ornamental and statuary purposes and the like.

I claim:

1. A method for producing a glass-ceramic article exhibiting good machineability, good mechanical strength, moderate thermal expansion and good acid durability consisting essentially of tetrasilicic fluormica crystals uniformly dispersed throughout a glassy matrix, said crystals constituting at least about 50% by volume of the article, which comprises:

(a) melting a batch for a glass consisting essentially, in weight percent on the oxide basis as calculated from the batch, of about 45–70% $SiO_2$, 8–20% MgO, 8–15% $MgF_2$, a total of 5–35% ($R_2O+RO$), wherein $R_2O$ ranges from about 5–25% and consists of at least one oxide selected in the indicated proportion from the group consisting of 0–20% $K_2O$, 0–23% $Rb_2O$ and 0–25% $Cs_2O$, and wherein RO ranges from about 0–20% and consists of at least one oxide selected from the group consisting of SrO, BaO, and CdO, a total of 0–10% of oxides selected from the group consisting of $As_2O_5$ and $Sb_2O_5$ and a total of 0–5% of glass colorants;

(b) simultaneously cooling the melt at least below the transformation range thereof and shaping a glass article of the desired configuration therefrom, and (c) exposing said glass article to a temperature between about 650°–850° C. for between about ¼ and 10 hours, and thereafter to a temperature between about 800°–1200° C. for between about 1 and 100 hours, to obtain said tetrasilicic fluormica crystals therein.

2. A method for producing a glass-ceramic article according to claim 1 wherein said glass consists essentially, in weight percent on the oxide basis as calculated from the batch, of about 55–65% $SiO_2$, 12–20% MgO, 9–13% $MgF_2$, 7–18% $K_2O$, 0.5–8% $As_2O_5$, and a total of 0–20% of glass colorants.

3. A method for producing a glass-ceramic article according to claim 1, wherein said glass article is first exposed to a temperature between about 750°–850° C. for about 1–6 hours, and thereafter exposed to a temperature between about 1000°–1150° C. for about 1–8 hours.

(References on following page)

References Cited

UNITED STATES PATENTS

| | | | |
|---|---|---|---|
| 3,516,810 | 6/1970 | Ivey et al. | 65—33 |
| 3,458,330 | 6/1969 | Baak | 65—33 X |
| 3,325,265 | 6/1967 | Stookey | 106—39 DVC |
| 2,675,853 | 4/1954 | Hatch et al. | 106—39 DVC |
| 3,149,947 | 9/1964 | Eppler | 106—39 DVC |
| 3,206,355 | 9/1963 | Pfhehder | 65—33 X |

OTHER REFERENCES

Handbook of Glass Manufacture, vol. III, Tooley, Class 65—Pat. Off., pp. 192–199.

FRANK W. MIGA, Primary Examiner

U.S. Cl. X.R.

65—30, 60; 106—39 DVC